United States Patent [19]

Cerruti

[11] Patent Number: 5,494,320
[45] Date of Patent: Feb. 27, 1996

[54] QUICK JOINT FOR RAPID, TIGHT-SEAL CONNECTION OF PIPES, PARTICULARLY SUITABLE FOR PETROLEUM PIPES

[75] Inventor: Sergio E. Cerruti, Milanese, Italy

[73] Assignee: AGIP S.p.A., Milan, Italy

[21] Appl. No.: 237,842

[22] Filed: May 4, 1994

[30] Foreign Application Priority Data

May 12, 1993 [IT] Italy .................. MI93A0959

[51] Int. Cl.$^6$ ........................................... F16L 25/00
[52] U.S. Cl. ................ 285/332; 285/334.4; 285/386; 285/351; 285/917
[58] Field of Search .................... 285/386, 351, 285/354, 332, 334, 332.4, 906, 917

[56] References Cited

U.S. PATENT DOCUMENTS

| | | |
|---|---|---|
| 2,027,176 | 1/1936 | King . |
| 2,284,216 | 5/1942 | Kunkel . |
| 2,374,138 | 4/1945 | Sanford ................. 285/906 X |
| 2,463,883 | 3/1949 | Kinsey ................. 285/354 X |
| 3,055,683 | 9/1962 | Appleton ............. 285/906 X |
| 3,345,084 | 10/1967 | Hanes et al. ......... 285/351 X |
| 3,694,010 | 9/1972 | Callahan, Jr. . |
| 3,751,077 | 8/1973 | Hiszpanski . |
| 4,316,624 | 2/1982 | Davlin . |
| 5,060,988 | 10/1991 | Williamson ........... 285/354 X |
| 5,154,453 | 10/1992 | Nishio ................. 285/351 X |

FOREIGN PATENT DOCUMENTS

| | | |
|---|---|---|
| 419650 | 1/1911 | France . |
| 2641767 | 3/1978 | Germany ................. 285/334 |
| 144343 | 7/1920 | United Kingdom . |
| 487796 | 7/1938 | United Kingdom . |
| 1085228 | 9/1967 | United Kingdom . |
| 1381951 | 1/1975 | United Kingdom . |
| 1397493 | 6/1975 | United Kingdom . |

*Primary Examiner*—Dave W. Arola
*Attorney, Agent, or Firm*—Oblon, Spivak, McClelland, Maier & Neustadt

[57] ABSTRACT

Quick joint for rapid, tight-seal connection of pipes, in which from the end of the female hollow body an internal flaring with decreasing cross-section extends, suitable for getting engaged, with interference, with a corresponding external counter-flaring provided on the male hollow body in the neary of the overhanging shoulder of the latter which, on its one side, cooperates with the sleeve of the joint and, on its other side, cooperates with said end of said female hollow body; from the end of said male hollow body furthermore a second external flaring with decreasing cross-section extends, suitable for getting engaged, with interference, with a counter-flaring provided inside the interior of said female hollow body in the nearby of an internal shoulder for said male body.

Also preferred embodiments are disclosed.

15 Claims, 1 Drawing Sheet

QUICK JOINT FOR RAPID, TIGHT-SEAL CONNECTION OF PIPES, PARTICULARLY SUITABLE FOR PETROLEUM PIPES

BACKGROUND OF THE INVENTION

1. Field of the Invention

The present invention relates to a joint which, by realizing two metal seals with interference engagement activated by a screwable sleeve, makes it possible an easy, effective and cheap rapid, tight-seal connection of two pipes with each other to be accomplished with no need for said two pipes to be submitted to a revolutionary movement.

2. Discussion of Background

As known, in petroleum field and in particular in the operations for well completion, the need exists for connecting the production tubing with the so said tubing hanger at the wellhead. In the case of a single completion, said connection is made by simply screwing the single tubing onto the tubing hanger, a solution which is anyway impossible in the case of multiple completions, i.e., in the presence of two or more tubings to be connected, but using the expensive and complex through-adapter tubing hangers.

In order to obviate the above drawback, joints have been developed which make it possible the tubings to be connected with said tubing hanger, with no need for said tubings to be submitted to a revolutionary movement.

The joints known from the prior art substantially comprise a female hollow body to be butt-fastened to a tubing section, a male hollow body cooperating with said female body and to be fastened onto said tubing hanger, a first sleeve suitable for being screwed onto said male body in order to cause the elastomeric-elements seal provided between said bodies to become operating, as well as a second sleeve suitable for being screwed down onto said female body in order to ensure the mechanical continuity.

Unfortunately, such a kind of joint, besides a certain mechanical complexity, requires the use of two sleeves; and it does not ensure, with its elastomeric elements, an effective tightness of the sealing over time, in particular under such hostile operating conditions as generally met in petroleum field.

In order to accomplish a better seal tightness, in certain joints known from the prior art, a gasket was adopted which is constituted by a low-yield metal ring, but also this solution does not offer a high enough reliability, as required in the concerned field.

SUMMARY OF THE INVENTION

The purpose of the present invention is precisely of obviating the above said drawbacks and therefore supplying a joint which, besides making it possible pipes to be rapidly connected, also ensures that an effective and reliable tight-seal will be achieved also under extremely hostile operating conditions, i.e., under conditions of high differential pressures, and high temperatures.

The above purpose is substantially achieved by accomplishing, between the male hollow body and the female hollow body of the joint, a double metal interference seal activated by one single sleeve. In that way, in fact, whilst the metal interference seal, besides not requiring any additional elements such as gaskets, with it consequently being simpler from a constructional viewpoint—as a result of the seal being realized by the same metal male and female bodies which constitute the joint—additionally ensures the seal tightness to be achieved also in presence of extremely high internal pressures, with the double seal anyway securing the seal tightness also in presence of high external pressure.

Summing up, the joint for rapid, tight-seal connection of pipes, comprising a female hollow body to be butt-fastened onto a pipe, a male hollow body to be butt-fastened to a second pipe and cooperating with said female body, as well as a sleeve suitable for being externally screwed down onto said female body, is characterized according to the present invention in that the male hollow body is provided with an externally overhanging shoulder integral with said body, which shoulder cooperates, on one of its sides, with said sleeve and, on its other side, with the end of said female hollow body, from which an internal, decreasing-cross section flaring extends, which is suitable for coming into engagement, with interference, with a corresponding external counter-flaring provided on said male hollow body in the region nearby to the overhanging shoulder, from the end of the male hollow body a second decreasing-cross section flaring extending which is suitable for coming into engagement, with interference, with a corresponding counter-flaring provided inside the interior of said female body, in the region nearby an internal shoulder for the male body.

In that way, in fact, both said flarings/counter-flarings respectively provided on the metal male and female bodies of the joint realize the two metal interference seals, and namely, a primary seal at the end of the male body, which substantially realizes the internal seal; and a secondary seal at the end of the female body, which substantially realizes the external seal; which seals are activated by said sleeve being screwed down until it comes to rest against said overhanging shoulder, which also performs the task of rendering mutually mechanically integral both of the metal bodies of the joint.

Then, according a to preferred embodiment of the present invention, both said flarings and corresponding counter-flarings have a cone frustum shape.

Still according to a further preferred embodiment of the present invention, the flarings have a spherical-surface bulging and are designed to come into interference engagement with respective counter-flarings of cone frustum shape.

Finally, according to a still further preferred embodiment of the present invention, the terminal end of the male hollow body of the joint, comprised between the overhanging external shoulder and its end, is tapered towards said end thereof, correspondingly to the terminal portion of the female body of said joint.

In that way, sliding and trueing the male body into the female body is made easier.

BRIEF DESCRIPTION OF THE DRAWINGS

The invention is explained now in greater detail by referring to the accompaning drawing which illustrates preferred embodiments supplied for merely exemplifing, non limitative, purposes, because technical or constructional variants may be always supplied without departing from the scope of the present invention.

In said drawing.

DESCRIPTION OF THE PREFERRED EMBODIMENTS

Figure 1:
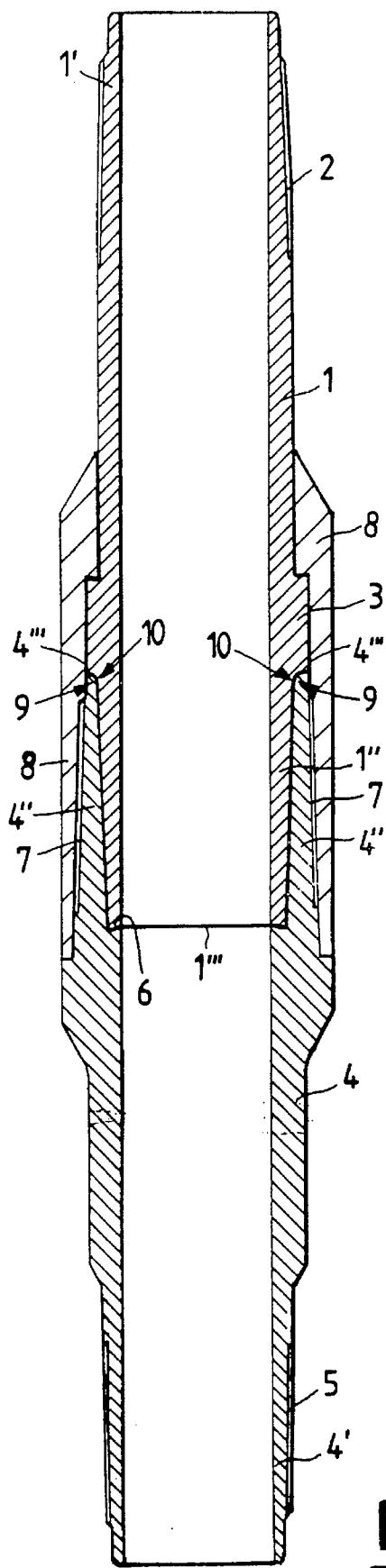
FIG. 1 displays a longitudinal sectional view of a joint for rapid, tight seal connection of pipes, accomplished to the present invention.

Referring to the Figures, with 1 the male hollow body of the joint is indicated, the terminal portion 1' of which is provided with a screw thread 2, which makes it possible for the male body to be fastened onto one of the two pipes or elements to be connected with each other (not displayed in figure). The terminal portion 1''', comprised between its end 1'''' and an outwards overhanging shoulder 3 integral with the body 1, of the male hollow body is tapered towards the end 1'''' thereof in order to facilitate its sliding and trueing into the terminal portion 4'' of the female body 4 of the same joint. The portion 4'' of the female hollow body is tapered with a complementary pattern; and the terminal portion 4' of the female body 4 is then additionally provided with a screw thread 5 which makes it possible for the female body to be fastened onto the other of the pipes or tubing elements to be connected. The terminal portion 4''' is provided with an internal shoulder 6 for the end 1'''' of the male body 1, and with an external screw thread 7 which makes it possible for a sleeve 8 sliding along the male body 1 to be screwed down onto the female body, until the sleeve comes to rest against the overhanging shoulder 3. The female body further includes an end 4'''' which comes to rest against the lower side of the overhanging shoulder 3.

Figure 2:
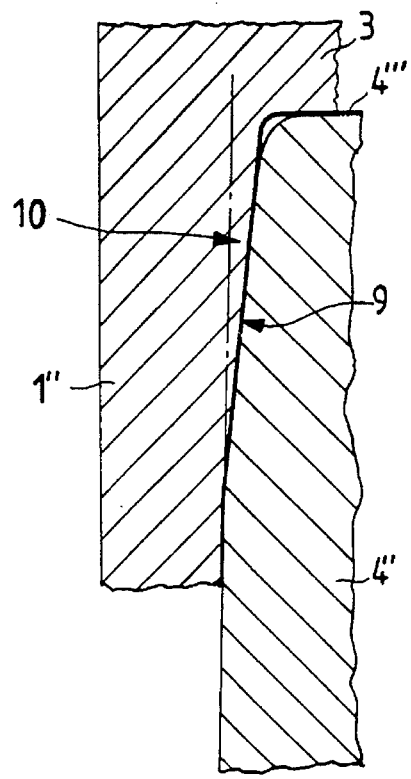
FIG. 2 shows a longitudinal section view, on a strongly enlarged scale, of a detail of the joint of FIG. 1.
Figure 3:
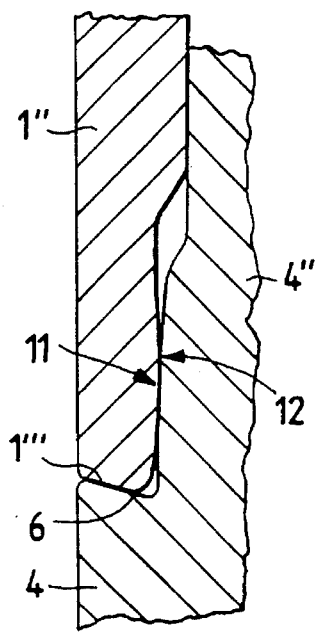
FIG. 3 displays a longitudinal sectional view, on a strongly enlarged scale, of another detail of the joint of FIG. 1.

From the end 4'''' of the female body 4, an internal flaring 9 having a decreasing cross-section extends (specific references is made here to FIG. 2), which is suitable for getting into an interference engagement, under tight-seal conditions, with a corresponding external counter-flaring 10 provided on said male body 1. Correspondingly, from the end 1'''' of said male body 1, a bulged flaring with spherical surface 11 extents externally, which is suitable for getting into interference engagement with a respective cone-frustum counter-flaring 12 provided on said female body 4.

The operating way of such a kind of joint is now evident.

After the male hollow body 1 is slid into the female hollow body 4, when the sleeve 8 is screwed down onto the female body 4, by means of the screw-thread 7, a relative motion between both of the bodies 1 and 4 is generated which, by overcoming the resistance caused by the interference engagements between the flarings 9 and 11 and their respective counter-flarings 10 and 12, realizes the metal interference seals between the flarings and counter-flarings, which metal interference seals ensure the seal tightness against both internal and external pressures, whichever they may be.

I claim:

1. A joint for rapid, tight-seal connection of pipes, comprising a female hollow body to be butt-fastened onto a pipe, a male hollow body to be butt-fastened to a second pipe and cooperating with said female body, and a sleeve suitable for being externally screwed down onto a thread provided on said female hollow body, wherein said female hollow body includes an internal shoulder and said male hollow body is provided with an externally overhanging shoulder integral with said male hollow body, wherein said shoulder of said male hollow body cooperates, on a first side with said sleeve such that said sleeve is urged against said first side when said sleeve is screwed onto the thread of the female hollow body and, on a second side, with an end of said female hollow body, said female hollow body including a first decreasing cross-section flaring which extends to said end of said female hollow body, wherein said first decreasing cross-section flaring of said female hollow body comes into an interference engagement with a corresponding external counter-flaring provided on said male hollow body in at least a portion of a region adjacent said overhanging shoulder, said male hollow body including a second decreasing cross-section flaring, wherein said second decreasing cross-section flaring of said male hollow body comes into an interference engagement with a corresponding counter-flaring provided inside the interior of said female hollow body in at least a portion of a region adjacent said internal shoulder of said female hollow body, wherein said male hollow body and said female hollow body are urged toward one another when said sleeve is screwed onto the thread of the female body and said sleeve is urged against said first side of said shoulder of said male hollow body to thereby ensure tight seals at said interference engagements.

2. The joint for rapid, tight-seal connection of pipes according to claim 1, wherein said flarings and corresponding counter-flarings have a cone frustum shape.

3. The joint for rapid, tight-seal connection of pipes according to claim 1, wherein said flarings have a bulging spherical-surface which have an interference engagement with respective counter-flarings having a cone frustum shape.

4. The joint for rapid, tight-seal connection of pipes according to claim 1, wherein a terminal end portion of said male hollow body of the joint disposed between said overhanging external shoulder and an end of the male hollow body, is tapered towards said end thereof, and said female hollow body includes a corresponding terminal end portion tapered towards the end of said female hollow body and extending adjacent to said terminal end portion of said male hollow body.

5. The joint of claim 1, wherein said female hollow body further includes an external shoulder, and wherein an end of said sleeve is disposed adjacent to said external shoulder of said female hollow body.

6. A joint comprising:

a male hollow body;

a female hollow body; and a sleeve;

said male hollow body including an external shoulder having first and second sides, and a decreasing cross-section flaring extending to an end of said male hollow body;

said female hollow body including an internal shoulder, said female hollow body including a decreasing cross-section flaring extending to an end of said female hollow body, with said end of said female hollow body adjacent to said second side of said external shoulder of said male hollow body, and wherein said end of said male hollow body is adjacent to said internal shoulder of said female hollow body;

said sleeve including an internal shoulder;

wherein said female hollow body further includes a counter-flaring which forms a first interference engagement with said decreasing cross-section flaring of said male hollow body, and said male hollow body includes a counter-flaring which forms a second interference engagement with said decreasing cross-section flaring of said female hollow body;

wherein said sleeve includes an internal thread which is screwed onto an external thread provided on one of said male hollow body and said female hollow body, and wherein when said sleeve is screwed onto said one of said male hollow body and said female hollow body said internal shoulder of said sleeve is urged against the other of said male hollow body and said female hollow body, thereby urging said male hollow body and said female hollow body toward one another and ensuring tight seals at said first and second interference engagements.

7. The joint of claim 6, wherein said female hollow body further includes an external shoulder, and wherein said sleeve includes an end disposed adjacent to said external shoulder of said female hollow body.

8. The joint of claim 7, wherein said first interference engagement is disposed adjacent to said internal shoulder of said female hollow body, and said second interference engagement is adjacent to said external shoulder of said male hollow body.

9. The joint of claim 6, wherein said flaring and counter-flaring forming said first interference engagement includes a bulged flaring having a spherical surface provided on said male hollow body and a cone-frustum counter-flaring provided on said female hollow body.

10. The joint of claim 9, wherein said first interference engagement is disposed adjacent to said internal shoulder of said female hollow body, and said second interference engagement is adjacent to said external shoulder of said male hollow body.

11. The joint of claim 6, wherein said first interference engagement is disposed adjacent to said internal shoulder of said female hollow body, and said second interference engagement is adjacent to said external shoulder of said male hollow body.

12. The joint of claim 11, wherein said sleeve is screwed onto an external thread provided on said female hollow body and said internal shoulder of said sleeve is urged against said first side of said shoulder of said male hollow body when said sleeve is screwed onto said female hollow body.

13. The joint of claim 12, wherein said female hollow body further includes an external shoulder and wherein an end of said sleeve is disposed adjacent to said external shoulder of said female hollow body.

14. The joint of claim 6, wherein at least one of said flarings includes a bulging spherical surface.

15. The joint of claim 6, wherein at least one of said counter-flarings includes a cone-frustum shape.

* * * * *